United States Patent [19]

Redmon et al.

[11] 4,006,715
[45] Feb. 8, 1977

[54] FARROWING CRATE ASSEMBLY

[75] Inventors: Jackson T. Redmon, Billings; Irvin Haidle, Fallon; Donald Herzog, Rapelje, all of Mont.; Joel C. Greene, Greer, S.C.

[73] Assignee: Agribest, Inc., Billings, Mont.

[22] Filed: Dec. 5, 1975

[21] Appl. No.: 638,149

[52] U.S. Cl. ................................................. 119/20
[51] Int. Cl.$^2$ ......................................... A01K 1/02
[58] Field of Search ............................... 119/20, 27

[56] References Cited

UNITED STATES PATENTS

| | | | |
|---|---|---|---|
| 2,928,371 | 3/1960 | Baker | 119/20 |
| 3,125,988 | 3/1964 | King | 119/20 |
| 3,318,286 | 5/1967 | Hargett, Jr. | 119/20 |
| 3,650,245 | 3/1972 | Karnes | 119/20 |
| 3,884,188 | 5/1975 | Arends | 119/20 |

*Primary Examiner*—Hugh R. Chamblee
*Attorney, Agent, or Firm*—Bailey, Dority & Flint

[57] ABSTRACT

This invention relates generally to animal crate construction such as farrowing crates for a sow and her new born piglets wherein a farrowing crate and a pair of associated side pens in which the piglets are free to move are provided. The farrowing crate includes vertical standards at each corner of the crate having a pair of interchangeable side members slideably received thereover spacing the vertical standards longitudinally and upper and lower bridger flanges carried between the tops and bottoms, respectively, of the standards so as to space the standards and opposed side members laterally. A pair of interchangeable door members are pivotably attached at each upper and lower bridger flange so that the door members can be selectively opened from each side. The interchangeable side members have offset side frame portions so as to vary the width of the crate interior when the side members are carried by the standards in a reverse or interchangeable manner. The side members are adjustable in height so as to permit the piglets to enter the side pens while preventing the sow from so doing. A highly versatile farrowing crate is thus provided which can be utilized in a variety of operating conditions.

13 Claims, 8 Drawing Figures

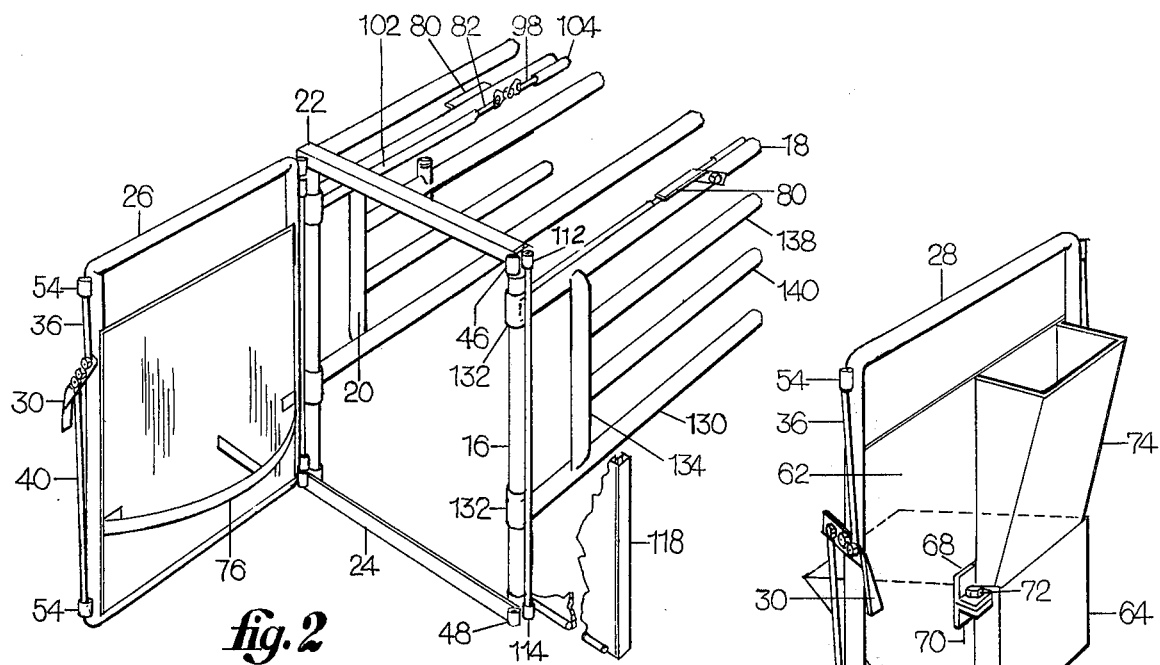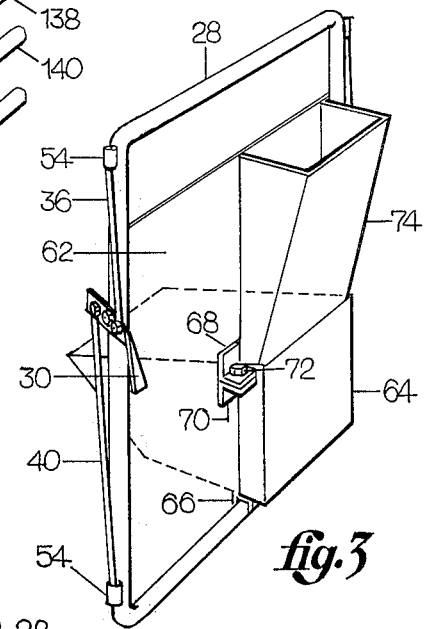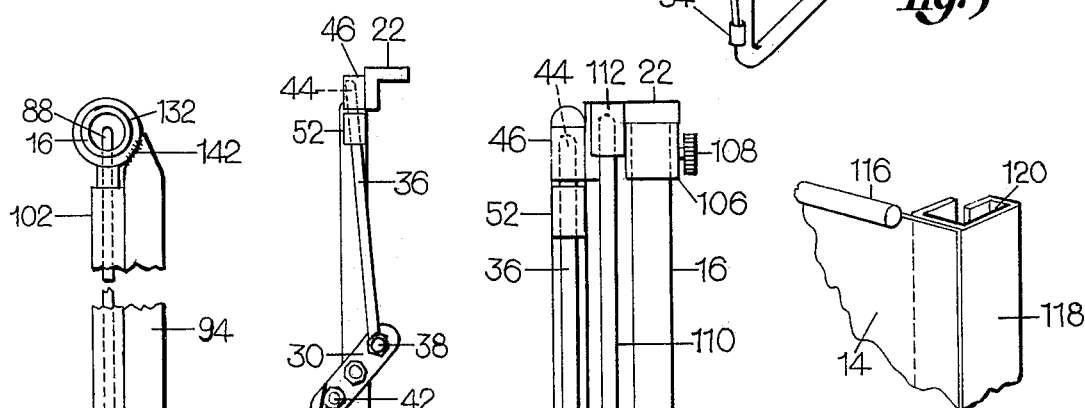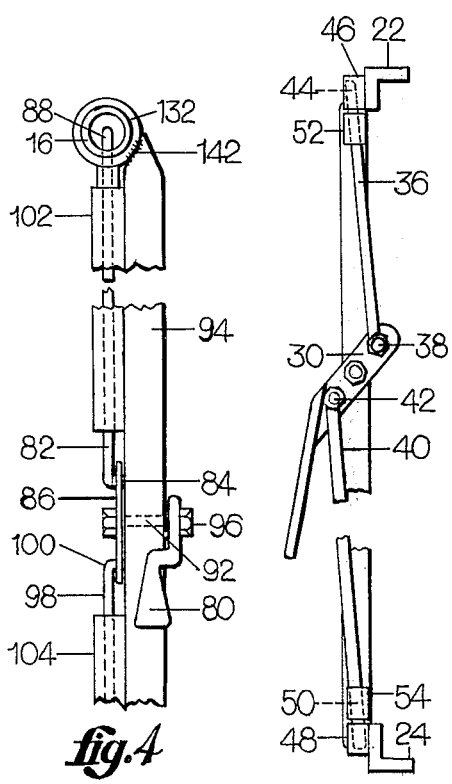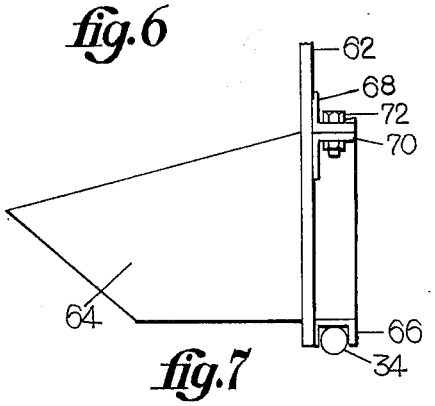

FARROWING CRATE ASSEMBLY

BACKGROUND OF THE INVENTION

It is generally well known that there is considerable danger to new born offspring during the farrowing period of hogs. The sow is often unaware of danger to the offspring, and there is a possibility of the small piglets being crushed by the weight of the sow, especially when birth is accomplished unattended. Heretofore, farrowing crates have been provided for a sow which is so constructed that the piglets cannot be readily injured by the sow such as shown in U.S. Pat. Nos. 1,230,237 and 1,361,260. However, such construction has often been at the sacrifice of simplicity and diversity of operation uses.

Another prior construction is shown in U.S. Pat. No. 3,125,988 wherein a plurality of tubular rail side and door members are constructed together. Such a construction provides a more easily assembled and disassembled crate, but the large number of members which are fastened together often tends to create a loose structure lacking in structural integrity and rigidity.

SUMMARY OF THE INVENTION

A farrowing crate assembly is provided for a sow and her piglets and the like including a farrowing crate and a pair of associated side pens connected on each side of said farrowing crate. The farrowing crate comprises a plurality of spaced vertical standards, a pair of interchangeable opposed side members slideably received over the spaced vertical standards spacing said vertical standards longitudinally, and an upper and lower bridger flange carried between the top and bottom, respectively, of said vertical standards so as to space said vertical standards and said opposed side members apart laterally.

A pair of interchangeable door members are carried by the bridger flanges, and attachment means are carried adjacent each side of the door members providing a pivotal attachment at each upper and lower bridger flange so that the door members can be selectively opened from either side.

The interchangeable side members each may be reversed on their respective standards and have outwardly offset side frame portions so as to vary the width of the crate interior between the side members when carried by the standard in a reverse manner. Locking means are carried by the interchangeable side members cooperating with the vertical standards to lock the side members in a desired height position along the vertical length of the standards.

Thus, the interchangeable side members may be reversed varying the width of the crate interior to accommodate different size sows, the door members may be interchanged permitting entry of the sow through either end of the crate and the door members being operable from either side providing utilization in a variety of configurations and spaces so that a highly versatile farrowing crate is provided.

Accordingly, it is an important objective of the present invention to provide a farrowing crate assembly for a sow and piglets which provides safety to the piglets while providing a variety of operational configurations and uses.

Another important object of the present invention is to provide a farrowing crate having interchangeable and reversible side members which permit the width of the crate to be varied so as to accommodate different size sows.

Still another important object of the present invention is to provide a farrowing crate which has a pair of door members which can be interchanged with each other permitting entry of the sow at either end of the crate and location of the feeding system which is carried in one of the door members at the proper end of the crate.

Still another important object of the present invention is to provide a farrowing crate having a pair of door members which can be pivotably opened from either side of the crate so that a plurality of crates may be interconnected side by side and the door operation can be arranged to give the most convenient operation.

Still another important object of the present invention is to provide a farrowing crate wherein the delivery of water to the pen is simplified and wherein the water delivery line is prevented from destruction by the sow.

BRIEF DESCRIPTION OF THE DRAWING

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a fragmentary perspective view of a farrowing crate construction in accordance with the present invention illustrating a door construction, FIG. 3 is a perspective view illustrating a door member constructed in accordance with the present invention which carries an animal feeding system, FIG. 4 is a fragmentary section taken along line 4—4 of FIG. 1, FIG. 5 is a sectional view taken along line 5—5 of FIG. 1, FIG. 6 is a fragmentary enlarged view of a corner construction of a farrowing crate constructed in accordance with the present invention, FIG. 7 is a cut-away side elevational view illustrating a feeding trough carried on a door member constructed in accordance with the present invention, and FIG. 8 is a fragmentary corner view illustrating a side panel of an associated side pen constructed in accordance with the present invention.

DESCRIPTION OF A PREFERRED EMBODIMENT

Figure 1:
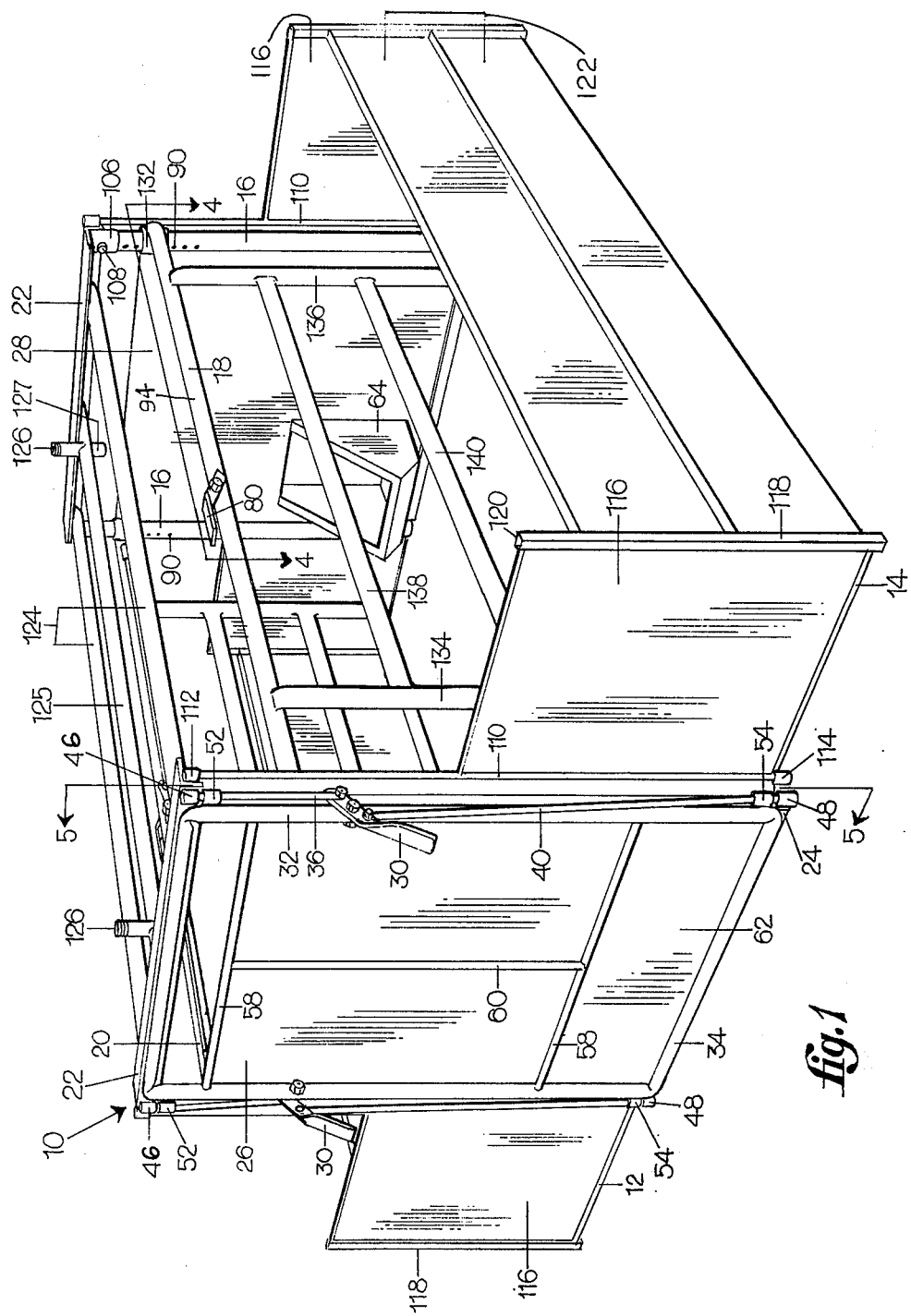
FIG. 1 is a perspective view illustrating the farrowing crate assembly constructed in accordance with the present invention.

The improved construction of the assembly of the present invention may be incorporated in housings for many types of animals, however, a preferred construction may be had for the crates of sows and new born piglets. Accordingly, it is chosen to illustrate the present invention in connection with the farrowing of pigs.

Referring now to FIG. 1 of the drawings, a farrowing crate assembly is illustrated having a farrowing crate, designated generally, at 10 and a pair of associated side pens 12 and 14. The farrowing crate includes a plurality of spaced vertical standards 16 located at the four corners of the farrowing crate 10, and a pair of interchangeable opposed side members 18 and 20 which are slideably received over the spaced vertical standards 16 spacing the vertical standards longitudinally at opposite ends of each respective side member 18 and 20. The side members 18 and 20 may be interchanged with each other as well as may be reversable on their respective standards to vary the width of the crate interior as will be more fully explained and understood.

An upper bridger flange 22 and a lower bridger flange 24 are carried between the top and bottom, respectively, of the vertical standards 16 so as to laterally space the standards and the opposed side members 18 and 20. A pair of interchangeable door members 26 and 28 are carried by the upper and lower bridger flanges 22 and 24, respectively, at each end of the crate 10.

Attachment means are provided for pivotably attaching each of the door members 26 and 28 at each upper and lower bridger flange 22 and 24 so that the door members can be selectively opened from either side. The attachment means, as best shown in FIG. 5, includes a levered handle 30 pivotably carried on each of the vertical sides 32 of a substantially rectangular door frame 34. Each of the levered handles 30 has one end of a first rod member 36 attached thereto at 38 by any suitable means such as a nut and bolt arrangement extending through a hole formed in the end of the first rod member at 38. A second rod member 40 has an end portion pivotably attached to the levered handle 30 at 42 in a similar manner. The first rod member 36 has a remote, opposite end 44 receivable in a collar member 46 carried on the upper flange member 22 and a similar collar member 48 is carried on the lower bridger flange 24 for receiving the remote end 50 of the second rod member 40 providing a hinge joint about which the door members 26 or 28 may be selectively pivoted about either side. The attachment means further include a second pair of collar members 52 and 54 carried by the door members adjacent the upper and lower ends thereof aligned with the collar member 46 and 48, respectively.

The first rod member 36 is received through the aligned collar members 52 and 46 and the second rod member 40 is received in the aligned collar members 54 and 48 when the levered handle is in a closed or locking position providing structural integrity to the hinge point provided thereby. A similar pivotable attachment means is provided on the opposite side of the door member 26 whereby the door member 26 may be opened from either side by raising up the levered handle 30 so as to withdraw the first and second rod members 36 and 40 from their associated collar members and pivoting the door about the opposite attachment means. The pivotal attachment means described above is also provided on the opposite door member 28 in an identical manner, thus, the door members 26 and 28 may be interchanged with each other so as to allow entry of the sow at either end of the crate 10 resulting in the feeding means 64 carried by the door 28 at the proper end of the crate.

Each of the door members 26 and 28 includes the substantially rectangular outer frame 34, cross frame members 58 and 60, and a solid sheetmetal or steel backing 62. The door member 28 is constructed similarly except that part of the door is cut out to provide for the feeding means 64.

The feeding means includes a feeding trough 64 which is pivotably carried by a square U-shaped bracket 66 which is received over a bottom horizontal member of the rectangular frame 34. The feeding trough 64 is received through a cut out portion in the sheetmetal back 62 of the door member 28 and is fastened thereto by utilizing a pair of L-shaped bracket members 68 and 70 and a nut and bolt member 72 which passes through an aligned aperture in the two bracket members. The bracket member 68 is fastened to the solid sheetmetal backing member 62 and the bracket 70 is fastened to a side flange integral with the feeding trough 64. Thus, the bolt member 72 may be removed from the cooperating bracket members and the feed trough may be tilted backwards and rolled out of the door frame member for convenient washing or cleaning thereof. A feeding bin 74 is provided which extends downwardly into the feeding trough 64 to deliver a controlled amount of feed in a conventional manner. The other door member 26 carries a bar member 76 which prevents the sow, as she moves backward against the door to sit down, from sitting on the piglets.

Locking means are provided for the interchangeable side members 18 and 20 which cooperates with the associated vertical standards 16 to lock the side members in a desired height position along the vertical length of the standards. The locking means includes a levered handle 80 pivotably carried by each of the side members 18 and 20, a first rod element 82 having one end 84 connected to a bar member 86 and a second end 88 which is received through one of a plurality of openings 90 provided in each of the vertical standards 16 for locking the side members in the desired height position. The bar member 86 is operatively connected to the levered handle 80 by means of a keyed bolt member 92 which extends through the bar member 86, an upper tubular frame member 94, the levered handle 80 and is secured thereto by a nut member 96 received over a threaded end of the keyed bolt member. The end 84 of the first rod element which is attached to the bar member 86 is received through an aperature adjacent the end of the bar member 86 and may be secured therein by means of a cotter pin arrangement, or other suitable connecting means may be used such as threads provided on the end 84 and a cooperating nut member. A second rod element 98 has an end 100 connected to the bar member 86 in a similar manner. The opposite, remote end of the second rod element extends through the desired opening 90 in the opposite standard member at the opposite end of the side member 18.

The first and second rod elements 82 and 98, respectively, are received through a first and second sleeve member 102 and 104, respectively. The sleeve members 102 and 104 preferably are ½ inch tubular pipe members and slideably support the first and second rod elements while aligning the rod elements with the cooperating holes 90 formed in the opposed vertical standards 16. The sleeve members 102 and 104 are carried by the upper tubular frame member 94 such as by welding. The sleeve members 102 and 104 and their associated rod elements 82 and 98 extend linearly between opposed vertical standards 16 at each end of the side member 18. With the levered handle 80 in a down position resting against the top of the tubular member 94 the remote ends of the first and second rod elements 82 and 98, respectively, will be extended through the openings 90 in the associated vertical standards 16. With the levered handle 80 raised upwardly, the rod elements 92 and 98 will have their remote ends withdrawn from the openings 90 in the associated standards 16 so that the side member 18 may be adjustably positioned up and down the vertical standards 16. An identical locking means is provided on the opposed interchangeable side member 20.

The side members 18 and 20 are interchangeable in that they are interchangeable with each other and also are reversible on their respective vertical standards 16 by removing the upper bridger flange 22 on each end of the crate 10 and removing the side members completely thereover.

The bridger flanges 22 and 24 are attached to the vertical standards 16 by a collar member 106 which is received over the ends of the standard and locked in place by any suitable means such as a set screw 108. The bridger flanges 22 and 24 are attached to the top and bottom edge of each of the standards 16 in the same manner of each end of the crate. Such provides for quick and easy assembly and disassembly of the farrowing crate and minimizes the number of fastening parts of the assembly.

The associated side pens 12 and 14 include a suitable vertical rod attachment member 110 which is received at one end in an upper collar member 112 carried by the upper bridger flange 22, such as by welding, and at the opposite end by a lower collar member 114 carried by the lower bridger flange 24. An identical construction is provided for attaching both of the associated side pens 12 and 14 to the farrowing crate 10. Each of the associated side pens 12 and 14 has an end panel 116 extending at right angles from the crate 10 and terminating in a vertical side 118 which includes a flanged groove 120 through which longitudinal side panels 122 have cooperating ends received therein. Identical construction is provided at both ends of the crate 10 for the associated side pens 12 and 14. In addition, a double end panel 116 may be provided to interconnect two farrowing crates 10 together when utilized in farrowing barns wherein a plurality of farrowing crate assemblies are utilized. The height of the side members 18 and 20 is adjusted to permit the piglets to enter the side pens but preventing the sow from so doing.

The farrowing crate 10 further includes a plurality of tubular frame members 124 extending between the upper bridge flanges 22 on opposed ends of the crate providing a top enclosure for the crate. One of the top frame members 125 being a tubular member and having a hollow center is utilized as a water delivery conduit having a pair of port couplings 126 either of which may be utilized as the inlet port to deliver water to a pair of outlet ports 127 located on the underneath side of the water conduit member 125. The outlet ports 127 are located adjacent each end of the crate 10 and may be selectively utilized depending on which end of the crate the sow's head is located so as to deliver drinking water to that end. By so utilizing a frame member of the crate as a water delivery conduit the chances of the sow destroying the conventional hose type delivery system is eliminated while making for a much simpler and cleaner crate construction. A conventional cap member may be placed over the inlet port 126 and outlet port 127 which is not being utilized, and the inlet and outlet ports may be provided with conventional threaded couplings for receiving a conventional threaded hose coupling therewith.

The interchangeable side members 18 and 20, are preferably constructed from 1 inch diameter, tubular members defining a frame having upper frame member 94 and lower frame member 130 suitably attached, such as by welding, to sleeve members 132 which are slideably received over the standards 16 at each end of the respective side members. The upper and lower frame members 94 and 130 are interconnected by vertical cross frame members 134 and 135 which have extending therebetween horizontal cross frame members 138 and 140.

As is best illustrated in FIG. 4, the upper and lower tubular frame members 94 and 130 are welded to the sleeve members 132 on an outside portion thereof at 142. Therefore, the tubular frame consisting of members 94, 130, and 134–140 defines an offset side frame portion on each of the interchangeable side members 18 and 20 which normally will be offset on the outside of standards 16 and sleeve members 132 by approximately one inch. Reversing one of the side members 18 or 20 by swapping ends on the respective standards will decrease the crate interior by approximately one inch since the tubular frame portion will be offset inwardly. Reversing both side members 18 and 20 will decrease the crate interior by approximately 2 inches. The same result is achieved by interchanging the side members 18 and 20 with each other. Thus, this advantageous construction feature provides quick and convenient variations in the width of the crate interior to accommodate different size sows preventing the sow from turning around in the crate. Of course, the tubular frame may be offset in construction more or less to provide different width reductions and variations.

Thus, it can be seen that an advantageous farrowing crate construction can be had in accordance with the present invention wherein the crate provides a variety of operational uses and configurations. The door members 26 and 28 may be interchangeable to permit entry of the sow through either end of the crate and the side frame members 18 and 20 may be interchanged as well as reversed in respective standards to vary the interior width of the crate to accommodate various size sows. The door members 26 and 28 are also openable from either side providing convenient utilization in farrowing barns wherein a plurality of farrowing crates are interconnected together. The farrowing crate construction is fastened together at the top and bottom end of the vertical standards 16 by placing the collar member 106 of the upper and lower bridger flanges 22 and 24 over the ends of the standards and tightening the set-screw 108 in place providing for quick and convenient assembly and disassembly of the farrowing crate assembly. Most of the individual crate components are metal tubular members and are fastened together by welding except where specific mention is made of other fastening or attachment means. The water supply and feeding system of the pen are also conveniently located for quick and easy maintenance while providing an overhead water supply to the sow eliminating the need for water supply hoses on or near the ground which can easily be destroyed.

While a preferred embodiment of the invention has been described using specific terms, such description is for illustrative purposes only, and it is to be understood that changes and variations may be made without departing from the spirit or scope of the following claims.

What is claimed is:

1. A farrowing crate assembly for a sow and her piglets and the like including a farrowing crate and a pair of associated side pens connected on each side of said farrowing crate, said farrowing crate comprising:
 a plurality of spaced vertical standards;

a pair of interchangeable opposed side members slideably received over said spaced vertical standards spacing said vertical standards longitudinally, said side members being interchangeable on said standards;

an upper and lower bridger flange carried between the top and bottom, respectively, of said vertical standards so as to space said vertical standards and said opposed side members apart laterally;

a pair of interchangeable door members carried by said bridger flanges;

attachment means carried adjacent each side of said door members providing a pivotal attachment at each upper and lower bridger flange so that said door members can be selectively opened from either side;

said interchangeable side members each having offset side frame portions so as to vary the width of the crate interior between said opposed side members when carried by said standards in said interchangeable manner so as to be selectively offset inwardly or outwardly; and locking means carried by said interchangeable side members cooperating with said vertical standards to lock said side members in a desired height position along the vertical length of said standards;

whereby said interchangeable side members may be interchanged varying the width of the crate interior to accommodate different size sows, said door members may be interchanged permitting entry of the sow through either end of the crate, and said door members may be opened from either side providing a highly versatile farrowing crate which may be utilized in a variety of configurations and spaces.

2. The assembly of claim 1 wherein said attachment means includes a levered handle pivotably carried by said door member at each side thereof having one end of a first rod member attached thereto and one end of a second rod member attached thereto, the opposite ends of said first and second rod member being received in collar members carried on said upper and lower bridge flanges providing a hinge joint together with said first and second rod members about which said door member may be selectively pivoted about either side.

3. The assembly of claim 2 wherein said attachment means further includes a pair of second collar members carried adjacent the upper and lower ends of said door members aligned with said collar members carried on said upper and lower bridge flanges receiving said opposite rod ends therethrough providing structural integrity to said hinge joint.

4. The assembly of claim 1 wherein said locking means includes a levered handle pivotably carried by each of said side members, a first rod element having one end connected to said handle, a second rod element having one end connected to said handle, a plurality of vertical spaced holes formed in said vertical standards on opposite ends of side members for receiving the opposite ends of said first and second rod elements whereby said levered handle may be pivoted so as to withdraw said ends from said holes permitting said side members to be adjusted vertically on said standards or to insert said ends within said holes locking said side members into place on said standards.

5. The assembly of claim 4 wherein said first and second rod elements are received in first and second sleeve members, respectively, extending from adjacent the opposed standards to adjacent said levered handle for supporting said rod elements therein while aligning said rod elements with said holes.

6. The assembly of claim 5 wherein said first and second sleeve members are carried by said side members linearly between said vertical standards at each end thereof.

7. The assembly of claim 6 wherein said offset side frame portion includes a plurality of tubular members defining a side frame portion offset on the outside of said standards and said sleeve members extending therebetween, said side frame portion being offset on the inside of standards and said sleeve members extending therebetween when carried by said standards in said interchangeable manner.

8. The assembly of claim 5 wherein each of said interchangeable side members is formed from a plurality of tubular frame members, said levered handle pivotably carried by an upper frame member, and said first and second sleeve members carried by said upper frame member.

9. The assembly of claim 1 wherein said farrowing crate further comprises a plurality of frame members extending between the upper bridge flanges on opposed ends providing a top enclosure for said crate, one of said frame members having a hollow center and an inlet and outlet ports for selectively delivering drinking water to one end of said crate.

10. The assembly of claim 3 wherein one of said door members carries removable feeding means for said sow.

11. The assembly of claim 1 wherein said locking means is carried by each said side member linearly between the vertical standards at each end thereof, and wherein each said offset side frame portion includes a plurality of tubular members defining a side frame portion offset from said standards and said locking means which can be selectively offset outwardly or inwardly therefrom to vary the width of the crate interior by interchanging said side member.

12. A farrowing crate assembly for a sow and her piglets and the like including a farrowing crate and a pair of associated side pens connected on each side of said farrowing crate, said farrowing crate comprising:

a plurality of spaced vertical standards;

a pair of opposed side members slideably received over said spaced vertical standards spacing said standards longitudinally, said side members being interchangeable on said standards;

an upper and lower bridger flange carried between the top and bottom, respectively, of said vertical standards so as to space said vertical standards and said opposed side members apart laterally;

a pair of door members carried by said bridger flanges;

attachment means carried adjacent each side of said door members providing a pivotal attachment at each upper and lower bridger flange so that said door members can be selectively opened from either side;

said side members each having offset side frame portions so as to vary the width of the crate interior between said opposed side members when carried by said standards in said interchangeable manner so as to be selectively offset inwardly or outwardly; and locking means carried by said interchangeable side members cooperating with said vertical standards to lock said side members in a desired height position along the vertical length of said standards;

whereby said interchangeable side members may be interchanged varying the width of the crate interior to accommodate different size sows, and said door members may be opened from either side providing a highly versatile farrowing crate which can be utilized in a variety of configurations and spaces.

13. The assembly of claim 12 wherein said locking means is carried by each said side member linearly between the vertical standards at each end thereof, and wherein each said offset side frame portion includes a plurality of tubular members defining a side frame portion offset from said standards and said locking means which can be selectively offset outwardly or inwardly therefrom to vary the width of the crate interior by interchanging said side member.

* * * * *